Feb. 6, 1951  J. Y. DUNBAR ET AL  2,540,105
VIBRATION RECORDER
Filed July 30, 1945  2 Sheets-Sheet 1
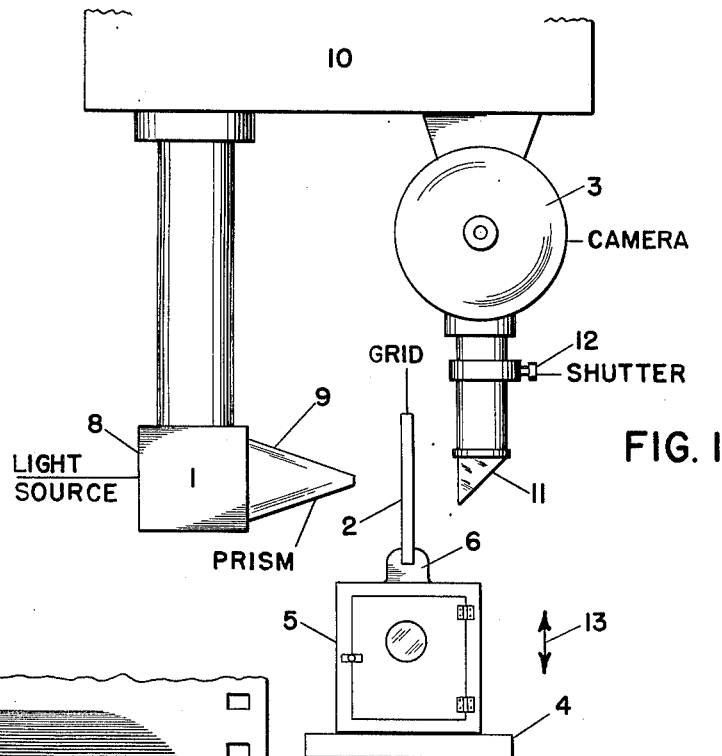
FIG. 1
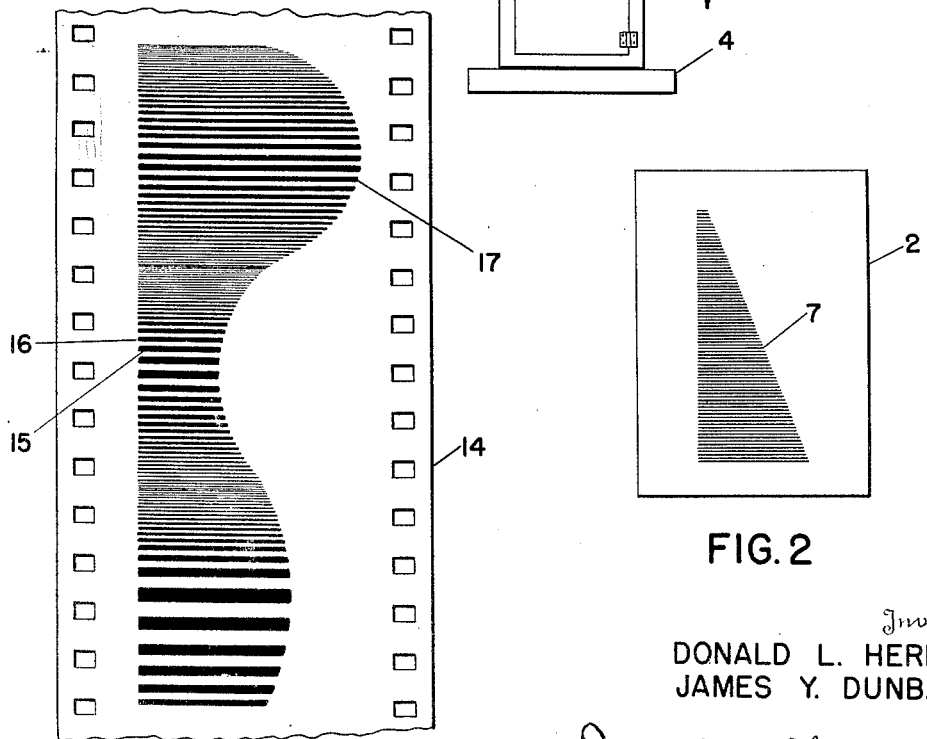
FIG. 2
FIG. 3
Inventors
DONALD L. HERR
JAMES Y. DUNBAR
By Ralph L. Chappell
Attorney

Patented Feb. 6, 1951

2,540,105

UNITED STATES PATENT OFFICE 2,540,105

VIBRATION RECORDER

James Y. Dunbar and Donald L. Herr,
United States Navy

Application July 30, 1945, Serial No. 607,893

2 Claims. (Cl. 346—108)

(Granted under the act of March 3, 1883, as
amended April 30, 1928; 370 O. G. 757)

This invention relates to vibration recording instruments, particularly to such an instrument designed to produce a film record showing displacement, velocity, and acceleration of a vibrating body, each as continuous, measured functions of time.

In studies relating to improvement of mechanical devices in their ability to withstand shock, it has become a common procedure to employ shock tests of various types. In general these tests amount to securing the device, instrument, or other piece of equipment, to a support which may be subjected to impacts of controlled intensity and direction. The severity of the test may be increased by suitable increments, possibly even to the destruction of the tested object. Specifications usually include reference to ability to withstand shock of described intensity without damage. The physical significance of such shocks of "described intensity" is, in the present status of the art, not too clearly defined, and this situation is largely due to the lack of adequate instrumentation to provide a phenomenological interpretation of the applied shock blows.

While the testing as described above gives useful data for the strengthening of parts and improvement of construction, most of these data are derived only by observation of gross damages inflicted by the test. Obviously if under a certain blow a piece of gear is broken, modification may be made so that subsequent models are able to withstand such a blow; however, results of impacts which do not cause noticeable damage give little, if any, indication of changes necessary to avoid such damage under shock of greater intensity. The whole procedure is more or less trial and error. It is desirable to find means whereby an intelligent evaluation of non-destructive shock tests may be made. Not the least reason for such a desire is to avoid the costly destruction of expensive pieces of equipment. Knowledge of such factors as velocity, acceleration and displacement of parts or the whole of a device will enable the problem to be studied without necessarily destroying a sample. Streamline design methods of engineering value rely upon and need accurate information of the accelerations, velocities and displacements experienced by shocked equipments, such as are provided by the instrument designed herein.

Approaches to the problem have been made by the employment of instruments which are designed to indicate acceleration of motion imparted by a certain shock, and by high speed motion pictures taken of the tested devices during the application of the shock. The former type of instrument may involve relatively movable parts, one of which is intended to be steady while the other is moved under influence of the vibrating table or object. Difficulties are encountered in this type of device in effectively isolating the relatively moving parts in such fashion as to avoid the introduction of extraneous vibrating frequencies into the indication. The motion picture approach too, has inherent difficulties. One of these is lack of positive measurement of the motion shown by the photograph. Another of these is laborious methods of obtaining data from the great number of discrete picture "frames."

It is therefore an object of our invention to provide an instrument capable of producing a record of the vibration of a body being shock-tested or vibration tested.

It is a further object of our invention to provide such an instrument in which there is no resilient or other connection between the moving and non-moving portions.

A further object is to provide an instrument capable of producing a record which will contain indications of velocity, acceleration and displacement of the object being tested.

It is a still further object of the invention to provide an instrument inherently capable of extreme accuracy.

The above and other objects of our invention not specifically alluded to are attained by the construction herein described.

Figure 1 is an elevation of an embodiment of the complete instrument as it would be used.

Figure 2 is a plan view of one element of the combination.

Figure 3 is a representation of a record obtained by the use of the instrument.

Figure 4:
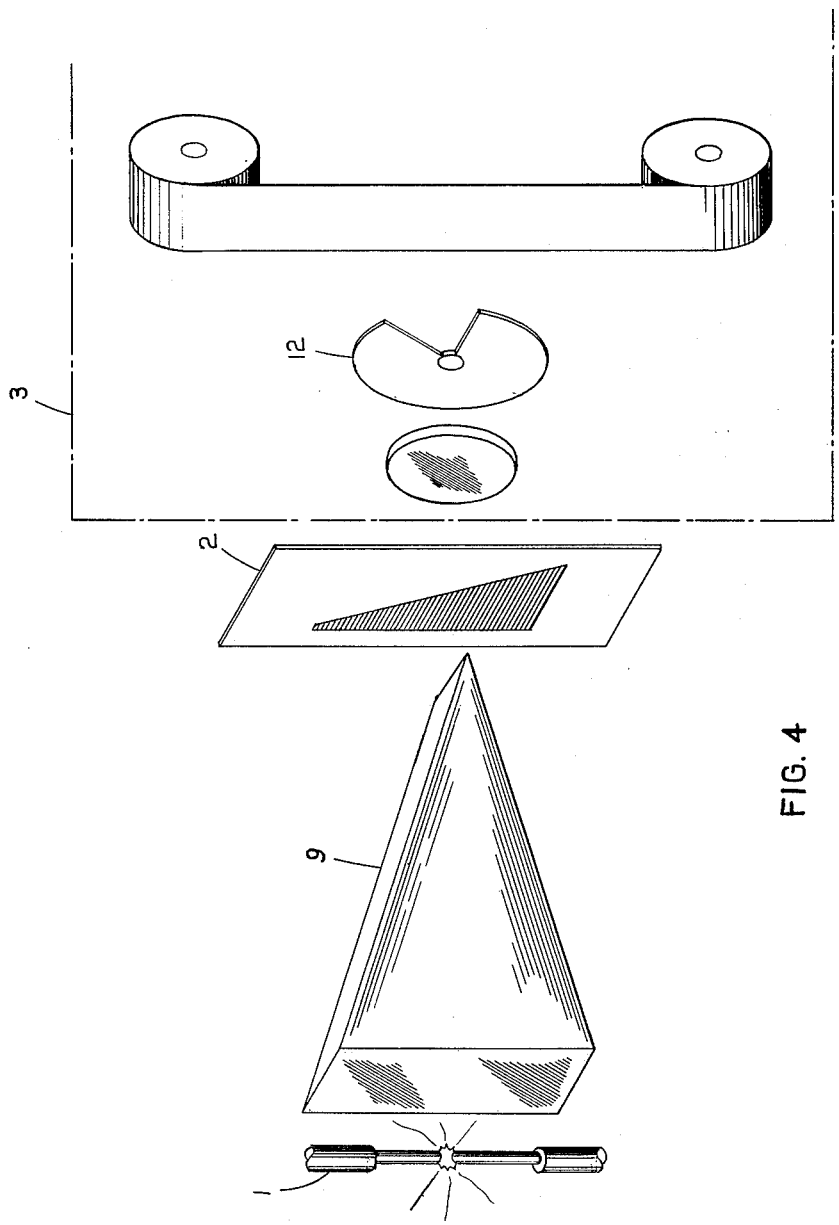
Figure 4 is a view of the light-source, prism, grid, camera, lens and shutter showing the arrangement of parts as assembled.

In Figure 1 which shows the general combination in somewhat diagrammatic form, there is shown the light source 1, vibrating grid 2, and recording camera 3. Two of these elements, namely, the source and the camera, are secured to a stable base represented by 19 which does not partake substantially of any motion which may be transmitted to the object under test. The third element, vibrating grid 2, is mounted securely on some portion of the test object, or in certain instances to the table of the test machine. As shown in Figure 1 grid 2 is mounted directly upon instrument 5 which has been secured to the table 4 of the shock-test machine. The numeral 6 represents a suitable form of support for the grid 2.

As is apparent from Figure 1, the grid 2 is interposed between the light source 1 and the camera 3. By its motion relative to the latter two elements, we are able to procure a record of the motion of the object to which the grid is attached.

Figure 2 indicates the construction of grid 2. In this instance the grid is constructed by the production of transparent lines upon opaque base material. Either this or the opposite type of construction will secure the desired results.

The light source 1 comprises a housing 8 containing any suitable source of high intensity illumination. Secured to an open side of the housing 8 is a device for concentrating the light, which in this instance comprises a prism of Lucite, or equivalent, 9. As embodied in a successful model this prism reduces in area from an area equal to the opening in the housing 8 to a very narrow vertical dimension at its outer end and a horizontal length slightly greater than the longest line of grid 2. There is provided an intensely brilliant slit of light, say two mils high and two inches wide at the narrow outer end of the prism, a large percentage of the light being concentrated therein.

The camera 3 is a representation of a drum or other contiguous type of camera. It comprises a suitable optical system, including in this application a prism 11, and a mechanically or electrically operated shutter 12.

Arrow 13 in Figure 1 indicates the direction of the expected motion which is to be recorded by the device. As indicated in Figure 1 the instrument is so set up that the grid 2 is interposed between the light source and the camera. Normally in the position of rest the line of light from the light source to the prism would pass through a middle portion of the grid 2 to allow for recording a motion both above and below the rest position. If the grid moves in the directions of arrow 13 before the light source, the light will alternately be allowed to shine through transparent portions and will be cut off by opaque portions of the grid. Causing the grid 2 to be mounted as indicated in Figure 2 that is with its longer lines at its bottom portion, movement of the device 5 to raise the grid between the light source 1 and the camera 3 would cause successively longer transparent lines to pass in front of the light source. Since the light which is allowed to pass the grid 2 then passes into the optical system of the camera, it will be seen that a film record including lines proportional in length to the lines of the grid may be made. The lengths of these lines will also be directly proportional to the up and down motion of the grid from an arbitrary reference point, and thus of the object under test.

A possible record is shown in Figure 3 which is a representation of a section of film which has been exposed in the instrument. Upon this developed film the lines 15 constitute the record. In the figure the left side 16 of the lines 15 is shown parallel to the edge of the film while the right side 17 varies in length. Such a record indicates motion with no component in the plane of the grid at right angles to that indicated by arrow 13.

Any variation in the left hand margin of the recorded lines as shown on the developed film indicates a lateral movement of the grid in response to any lateral vibration of the object being tested, and if the left hand margin were parallel with the edge of the film it would mean there was no lateral vibration.

Since the film in the camera is in constant, continuous motion during the recording, the thickness of the record lines will be greater than that of the beam of light. This will depend upon the speed with which the grid 2 cuts the light from the source 1 and upon the film speed. Thus as the speed of vibration decreases, both the lines and the spaces therebetween will increase in width while the numbers of both in a unit length of the film will decrease for a constant film speed. Hence, whereas the length of line or space on the recording, is proportional to the positive or negative displacement from the initial arbitrary reference point, the number of such lines or spaces per unit length of the recording film is proportional to the quasi-instantaneous velocity over the length of time corresponding to the unit length of film and the change in the number of such lines, or the change in "density" thereof, in going from one unit length of film to the next succeeding length of film is proportional to the quasi-instantaneous acceleration. In particular, a suitable sign convention, as is customarily done in all vibration and motion analyses, is established at the outset. Positive and negative displacements with respect to the arbitrary reference point will be correctly determined in sign by the length of recorded line with respect to the length of line situated at the arbitrary reference point. The correct sign, positive or negative, of the instantaneous velocities recorded is obtained from the geometric slope of the envelope of the line recording proportional to displacement. The correct sign, positive or negative, of the quasi-instantaneous acceleration is obtained directly from the recordings of changing line density per unit length. For example, if the displacement is positive, and is becoming increasingly positive, but at a decreasing rate, the acceleration, according to one convention is negative; if at an increasing rate, the acceleration is positive. Conversely, if the displacement is negative, and it is becoming more negative, then: if at an increasing rate, the acceleration is negative and, if at a decreasing rate, the acceleration is positive. The other particular cases follow directly and logically from this description of these specific cases. A suitable construction of the grid 2 comprises 250 transparent lines per inch each two mils in thickness and separated by opaque portions of like thickness.

Figure 3 is a copy of a recording such as this instrument makes of a motion which is of a constant, single frequency, and in which the phenomenon of physical damping takes place. It is observed that maximum and minimum length of lines represent the "crests" and "troughs," respectively, in the recorded wave characteristic associated with sinusoidal oscillation. The points of zero velocity, namely crests and troughs, are also points at which the velocity changes geometric sign. Hence, the recordings show a very "thin" line density in the neighborhood of these points, whereas the points of maximum velocity (where the displacement is practically zero) are characterized by maximum line density. At the points of maximum acceleration (at the crests and troughs), the change in line density is greatest; where the velocity is maximum (positive or negative) the change in line density is less, or zero. These latter points hence correspond to points of zero or small values of acceleration. The fact that the lines of maximum length and the lines of minimum length on each succeeding cycle, are approaching the same median length as a limit, is clear and ample description of the phenomenon of damping.

Proper calibration of the device will include control of the film speed, and knowledge of the relation between the lengths of the line 7 and the displacement perpendicular to those lines which is represented thereby. Calibration may be performed by causing known oscillation of the grid 2 and making records at controlled speeds of the record film. When the film is developed measurements of the recorded lines may be related to the known conditions.

As heretofore described only one motion has been contemplated. Since the vibration under study may be in more than one direction, it is to be noted that one other motion may be recorded with the device set up as shown in Figure 1. This second motion is that in the plane of the grid 2, but at right angles to the motion hereinbefore referred to. In Figure 1, this second motion would be into and out from the plane of the paper. This will show up on the record as a sidewise displacement of the left ends 16 of the recorded lines. It will be apparent that at a given vertical position of the grid 2, the length of the line recorded will not vary with displacement of the line along its length. However, such displacement may be measured on the record. It is contemplated that the grid 2 will be so secured to the device under test as to make its maximum expected motion perpendicular to the lines 7, and the second motion which it is desired to record parallel to the lines 7. A full study of all the motions of the device may be made by a plurality of set ups. To this end the mounting of the light source and camera may be constructed so as to facilitate proper orientation relative to the grid 2.

Since the record allows measurement of instantaneous velocity, comparisons of velocities indicated at successive points will provide information of acceleration and deceleration. Therefore, the three quantities necessary for a study of the forces acting on the tested object are available from a single record. Since the grid may be so light in weight as to affect the action of the object negligibly, the record is made without in any way introducing false and indeterminate factors.

As an aid to the practical operation of the apparatus, it is contemplated that the shutter 12 will be opened at the proper time by means actuated in conjunction with the application of the shock. Such means may take many forms, either electrical or mechanical. Manual operation is of course possible. The shutter will normally be closed at the end of one revolution of a drum camera, or when the desired length of film has been exposed once in any type camera which may be used. As a further aid to the practical operation of this device, the light source, 1, may either be of the continuous, but preferably of the modulated, type. The purpose of the modulated light source would be to automatically introduce a timed variation in light intensity, which, when reproduced on the record as intensity of line recording, would provide a direct measurement of "unit length" or appropriate timing scale. The success of this method of light modulation for timing of the recording is based on the fact that neither an incandescent wire light-source nor an incandescent gas light-source ever completely extinguishes, although it does fluctuate in intensity, when the modulation voltage is of the order of frequency of 500 cycles per second or greater. In any case, the modulated component of voltage may be employed imposed on a steady voltage, in case a minimum fluctuation in intensity is desired.

The camera disclosed is merely representative of those which expose a continuously moving film.

Obviously the exact form of the grid 2 which acts somewhat as a shutter for the recording camera will be subject to modification to suit the conditions for which it is to be used. Total height of the triangular lined area will be varied to suit the maximum expected vertical motion. Measurements of displacement on the record will be facilitated by having the total difference in the lengths of lines 7 as large as practical.

The invention described herein may be made or used by or for the Government of the United States for governmental purposes without the payment to us of any royalties thereon or therefor.

We claim:

1. A vibration recording apparatus comprising a vibrating member, a light source, means associated with the light source for directing the light into a narrow rectangular beam, a light sensitive recording device, an opaque grid containing a window, said window consisting of a plurality of parallel transparent portions arranged in progressively increasing length and positioned transversely across said grid, one end of all of said transparent portions being positioned an equal distance from one edge of said grid, the grid being interposed between the light source and the recording device and being arranged to vibrate with said member, whereby any vibration of the member is recorded as a plurality of unevenly spaced parallel lines of varying length, the distance between the lines being representative of the frequency of the vibration and the length of the lines being representative of the amplitude of the vibration.

2. A vibration recording apparatus comprising a vibrating member, a light source, means associated with the light source for directing the light into a narrow rectangular beam, a light sensitive recording device, an opaque grid containing a substantially triangular shaped window, said window consisting of a plurality of parallel transparent portions positioned transversely across said grid and being progressively longer when starting at the apex and going to the base of the triangle, one end of all of said transparent portions being positioned an equal distance from one edge of the grid, the grid being interposed between the light source and the recording device and being arranged to vibrate with said member, whereby any vibration of the member is recorded as a plurality of unevenly spaced parallel lines of varying length, the distance between the lines being representative of the frequency of the vibration and the length of the lines being representative of the amplitude of the vibration, and whereby a comparison between the length of successive lines is indicative of the acceleration or deceleration of the vibration.

JAMES Y. DUNBAR.
DONALD L. HERR.

REFERENCES CITED

The following references are of record in the file of this patent:

UNITED STATES PATENTS

| Number | Name | Date |
| --- | --- | --- |
| 958,181 | Schloemilch | May 17, 1910 |
| 1,552,450 | Roach | Sept. 8, 1925 |
| 1,759,580 | Kwartin | May 20, 1930 |
| 1,879,423 | Neale | Sept. 27, 1932 |
| 1,914,186 | Wente | June 13, 1933 |
| 2,078,302 | Wolff | Apr. 27, 1937 |
| 2,119,374 | Wulff et al. | May 31, 1938 |
| 2,141,175 | Dawson | Dec. 27, 1938 |
| 2,361,349 | Frazier | Oct. 24, 1944 |